United States Patent [19]

Matjasic

[11] Patent Number: 5,007,294
[45] Date of Patent: Apr. 16, 1991

[54] PROCESS AND DEVICE FOR MEASURING THE TENSION OF RACKET STRINGS

[75] Inventor: Klaus Matjasic, Schwalmtal, Fed. Rep. of Germany

[73] Assignee: Karl-Eberhard Mauve, Fed. Rep. of Germany

[21] Appl. No.: 378,228

[22] PCT Filed: Oct. 25, 1988

[86] PCT No.: PCT/EP88/00957

§ 371 Date: Jun. 21, 1989

§ 102(e) Date: Jun. 21, 1989

[87] PCT Pub. No.: WO88/03709

PCT Pub. Date: May 5, 1989

[30] Foreign Application Priority Data

Oct. 29, 1988 [DE] Fed. Rep. of Germany ....... 3736219

[51] Int. Cl.$^5$ .............................................. G01L 5/10
[52] U.S. Cl. ........................... 73/862.41; 73/DIG. 1
[58] Field of Search ................. 73/862.41, 778, 579, 73/581, DIG. 1

[56] References Cited

U.S. PATENT DOCUMENTS

| | | | |
|---|---|---|---|
| 2,792,707 | 5/1957 | Anderson | 73/862.41 X |
| 3,040,565 | 6/1962 | Church et al. | 73/778 X |
| 3,862,569 | 1/1975 | Lucas et al. | 73/778 |
| 4,114,454 | 9/1978 | Ernye et al. | 73/579 |

FOREIGN PATENT DOCUMENTS 0162794 11/1985 European Pat. Off.

*Primary Examiner*—Charles A. Ruehl
*Attorney, Agent, or Firm*—John R. Doherty

[57] ABSTRACT

A method and device for measuring the string tension of a strung racket such as a tennis racket wherein a mechanical/electrical transmitter is attached to the membrane made from the racket strings mounted crosswise onto a frame and measures the frequency of the membrane. The membrane is induced to freely oscillate in an aperiodically (non-periodically) manner by a light stroke onto the frame or by dropping a ball onto the membrane. The measured frequency is proportional to the string tension which is indicated by a display.

20 Claims, 7 Drawing Sheets

FIG. 8A minimum frequency

FIG. 8B maximum frequency

PROCESS AND DEVICE FOR MEASURING THE TENSION OF RACKET STRINGS

This invention relates to an improved method and device for measuring the string tension of rackets such as tennis, squash and racket ball rackets.

BACKGROUND OF THE INVENTION

It is already known from European patent application No. 0 141 976 to evaluate the string tension indirectly by finding the natural frequency of the strings. Due to the known basic correlation between the string tension and the corresponding frequency, the string tension can be calculated from the frequency.

To evaluate the frequency of the membrane which is formed by mounting the strings in a crosswise manner onto the racket frame, the conventional methods employ acoustical or mechanical devices to induce a forced oscillation. The amplitude value of the membrane oscillation is determined by a transmitter (transducer), such as a piezo crystal, for example, affixed to the membrane and the inducing frequency is then varied in order to find the point of resonance which is identical to the frequency of the membrane.

As conventional methods recommend the use of a variable frequency generator to induce an oscillation, these methods are complicated and expensive.

It is therefore an important object of this invention to provide an improved method and device for measuring the tension of racket strings which are simple to use, give reliable results and which can be employed with a reduced amount of equipment.

SUMMARY OF THE INVENTION

According to the invention, the membrane of the racket is aperiodically (non-periodically) induced to oscillate, for example, by tapping a finger to the frame or by dropping a ball of the related game, e.g. a tennis ball, onto the membrane. The free oscillation of the membrane after the aperiodical induction is then evaluated. The present method and device provides a simple, quick and reliable measurement of the string tension even in the extremely short period of time between the beginning of the induced oscillation and the complete dampening of this oscillation.

To measure the string tension according to the invention, it is only necessary to employ a simple frequency counter which is triggered by the oscillation signal itself. The complete test circuit according to the invention can therefore be assembled into one small unit which can be attached to the membrane of the racket for completing the measurement. The weight of the unit which is affixed to the membrane is preferably made substantially identical to the weight of a ball of the related game, e.g. a tennis ball, so that the mechanical conditions under which the test is carried out are comparable to the real playing situation when hitting a ball.

DESCRIPTION OF THE PREFERRED EMBODIMENTS

Figure 1:
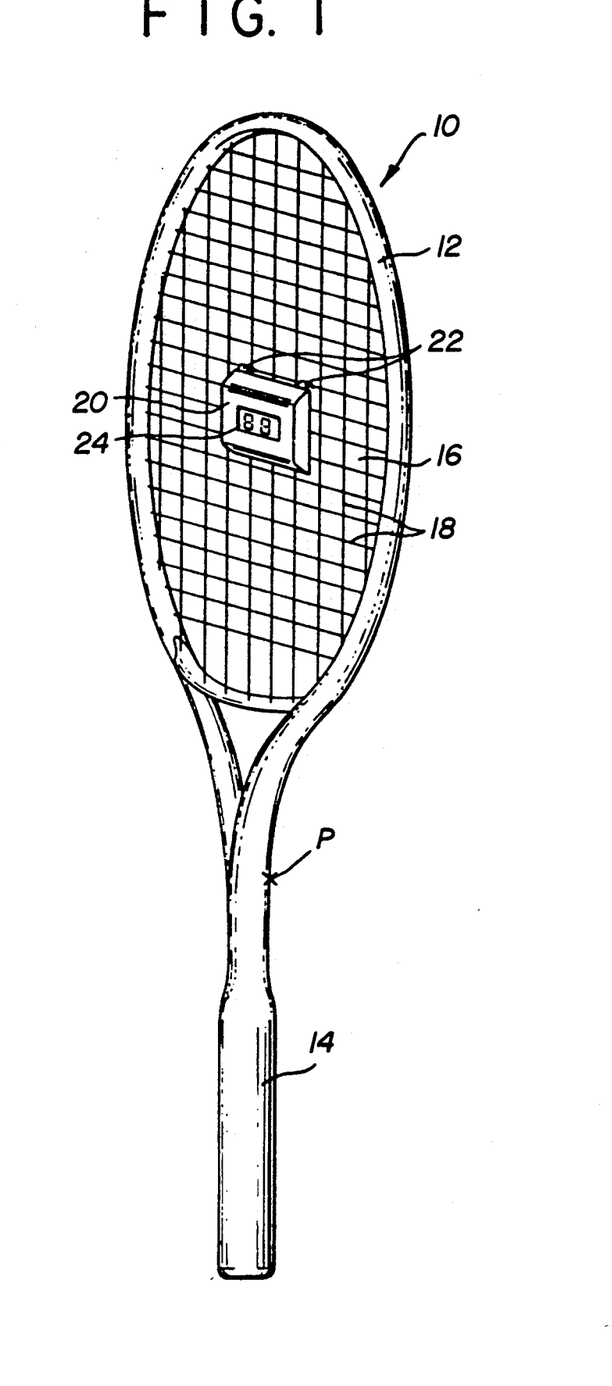
FIG. 1 is a perspective view of a tennis racket having affixed thereto a string tension measurement device according to one embodiment of the invention.

Referring now to the drawing, there is shown in FIG. 1 a tennis racket 10 having a frame 12, a handle 14 and a membrane 16 formed by a plurality of strings 18 which are mounted in a crosswise manner onto the frame 12. A tension measurement device 20 is affixed to the center of the membrane 16 by small clamps 22 and has a display 24 to indicate the string tension.

The housing of the device 20 contains a battery and a transmitter (not shown) which receives or picks up the mechanical oscillation of the membrane 16 and transmits an electrical signal. The device further includes an electrical circuit to which the signal is applied to calculate the corresponding string tension which is then shown in suitable units (kp. or lbs.) on the display 24.

To proceed with a tension measurement according to the invention, the device 20 is attached to the racket 10 in the manner shown in FIG. 1. The racket is then held horizontally and a ball is dropped from a height of approximately one (1) foot onto the membrane 16 thus inducing oscillation aperiodically and allowing the membrane to oscillate freely at its own natural frequency.

The transmitter, for example, a piezo element, provides an electrical signal which is proportional to the mechanical oscillation which the transmitter received or picked up from the membrane 16.

The average string tensions between about 20 and 70 lbs., for example, create with a weight of the transmitter of about 63 grams (equivalent to the weight of a tennis ball) frequencies in the range of approximately 90 to 160 Hz. The frequency is proportional to the square root of the string tension but within the above range can be approximated by a linear function. This allows a simple calculation to correlate the frequency to the string tension (kp. or lbs.)

Figure 2:
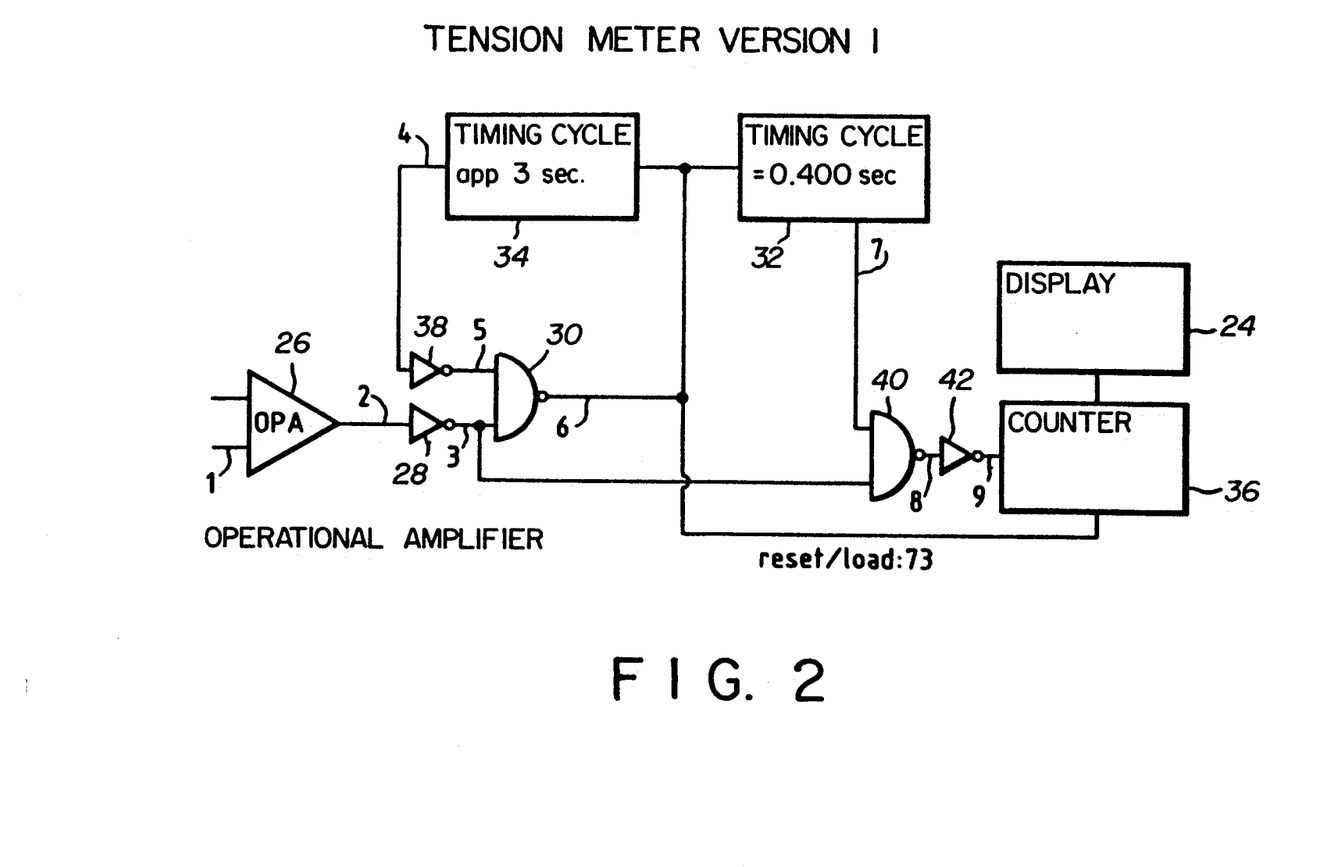
FIG. 2 is a circuit diagram showing the electrical components of the device of FIG. 1.

FIG. 2 shows a circuit for calculating the string tension according to one embodiment of the invention. As shown, the signal 1 from the transmitter is applied to an operational amplifier 26 having a high amplification ratio. After amplification the analog signal 1 is applied as a digital signal 2 to an inverter gate 28 and then to a NAND gate 30. The output 6 of the NAND gate 30 triggers the timers 32 and 34 and also resets/loads the counter 36 with a prefixed value, e.g. a value of 73.

The length of the timing interval 34 is prefixed to be longer than the time recommended for a complete dampening of the induced oscillation of the string-membrane. The output signal 4 of this timer 34 is applied to an inverter 38 and the inverted signal 5 is fed to the other input of the NAND gate 30. This inhibits retriggering of the timing elements 32 and 34 and the counter 36 by oscillations which occur after the timing interval for measurement has been completed.

The output signal 3 of the inverter 28 is also applied to another NAND gate 40 whose output signal 8 is then fed to the inverter 42. The inverted signal 9 from the inverter 42 is then fed to the counter 36. The signal 7 of the timer 32 is applied to the other input of the NAND gate 40 and controls the time in which the counting is enabled. At the end of the timing interval, the content of the counter 36 is shown on the display 24. The display unit 24 is preferably a two-digit LCD display.

The string tension T is approximated as a linear function of the oscillation frequency f:

$$T(f) = a \times f + b$$

The time of measuring, i.e., the timer 32 interval, is selected (e.g. 0.4 sec.) in such a way that the number of signals during these periods is equal to the product $a \times f$. The preset counter 36 value is equal to the value $100 + b$ (b 0). At the end of each measurement, the counter contains the value $T + 100$ but displays only the two lower 2-digits, thus indicating the string tension T (kp).

Figure 4:
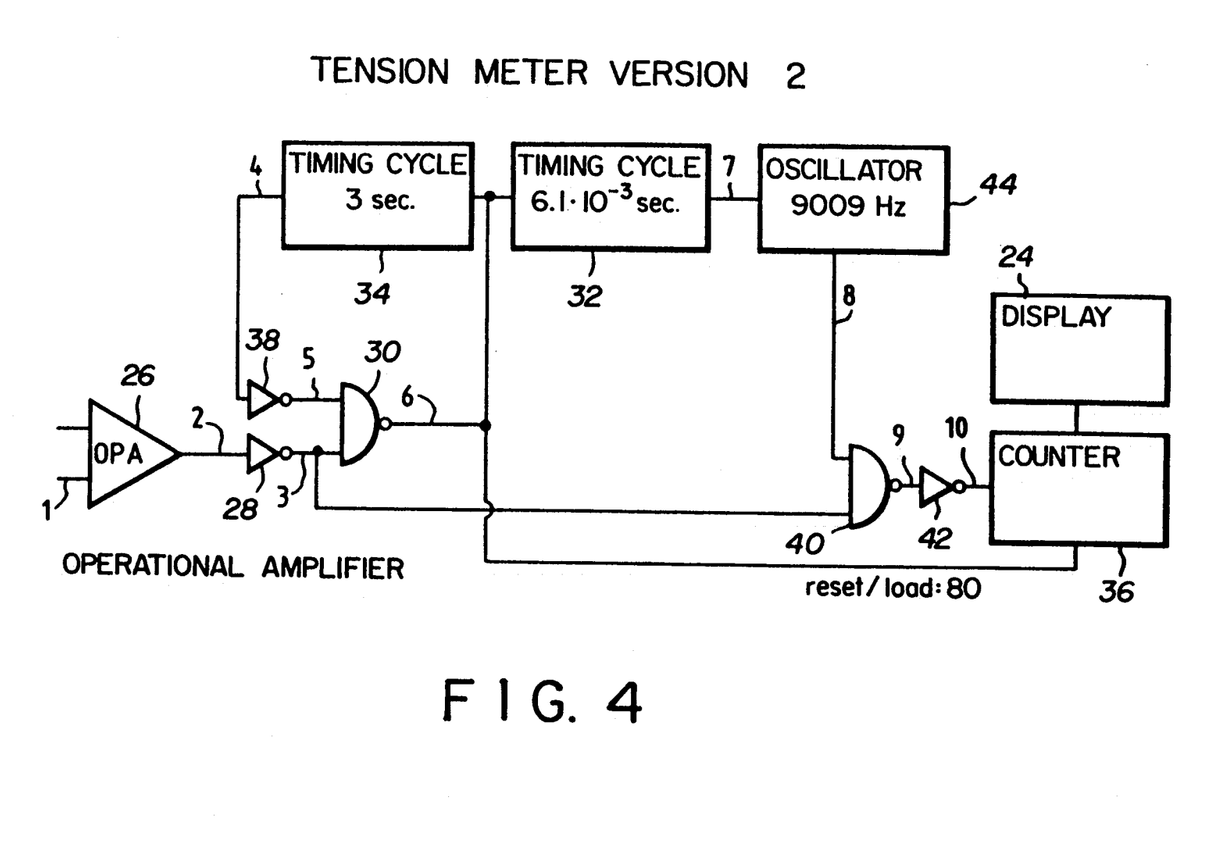
FIG. 4 is similar to FIG. 2 showing another embodiment of a tension measurement device according to the invention.
Figure 5:
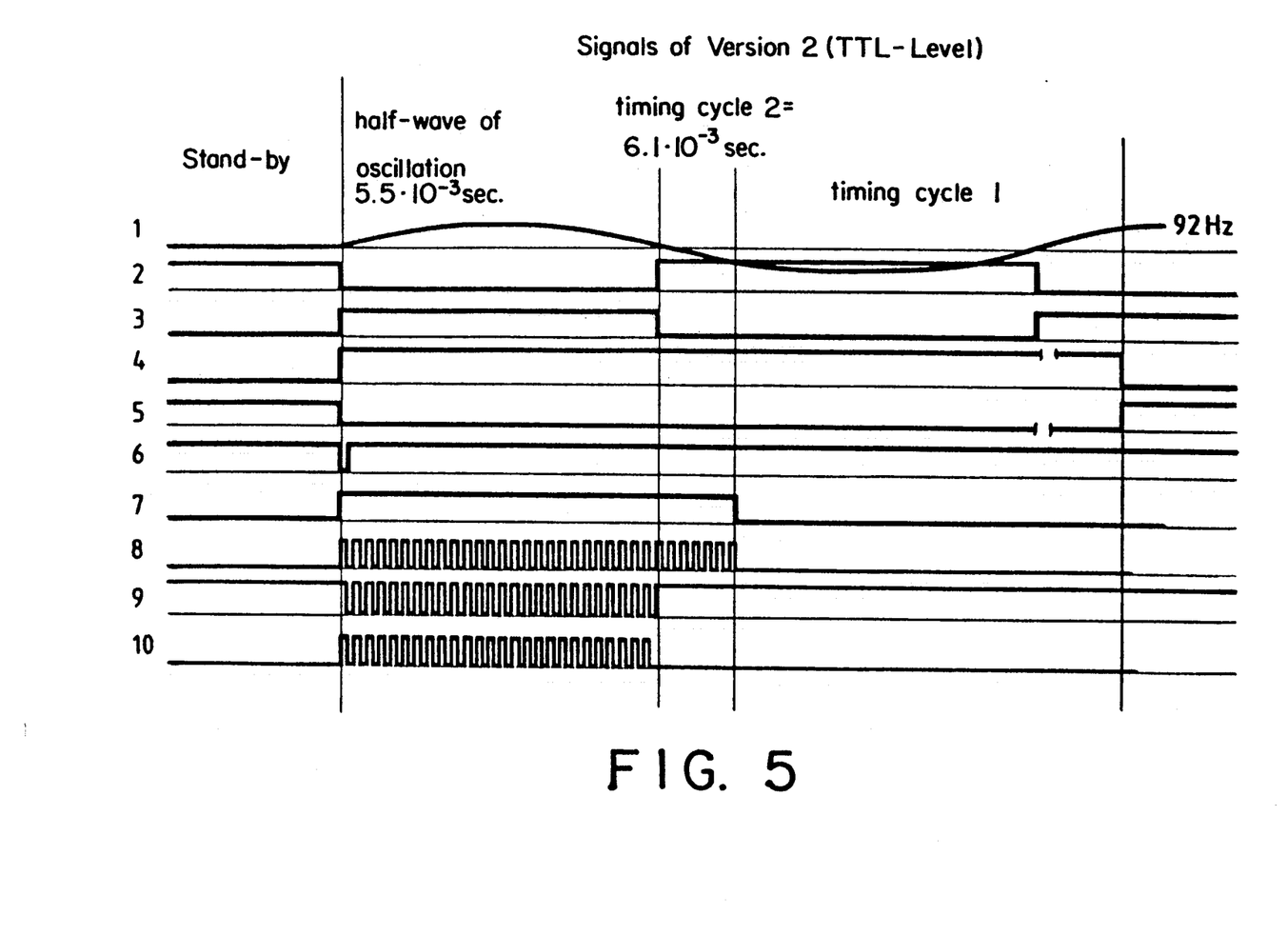
FIG. 5 is a time chart showing the signals produced by the device of FIG. 4.

FIGS. 4 and 5 show another embodiment of the invention wherein a measuring circuit is employed which enables the use of a shorter timing interval for each test and thus allows measurements on rackets with a high degree of shock absorption, i.e, with good dampening characteristics.

Figure 3:
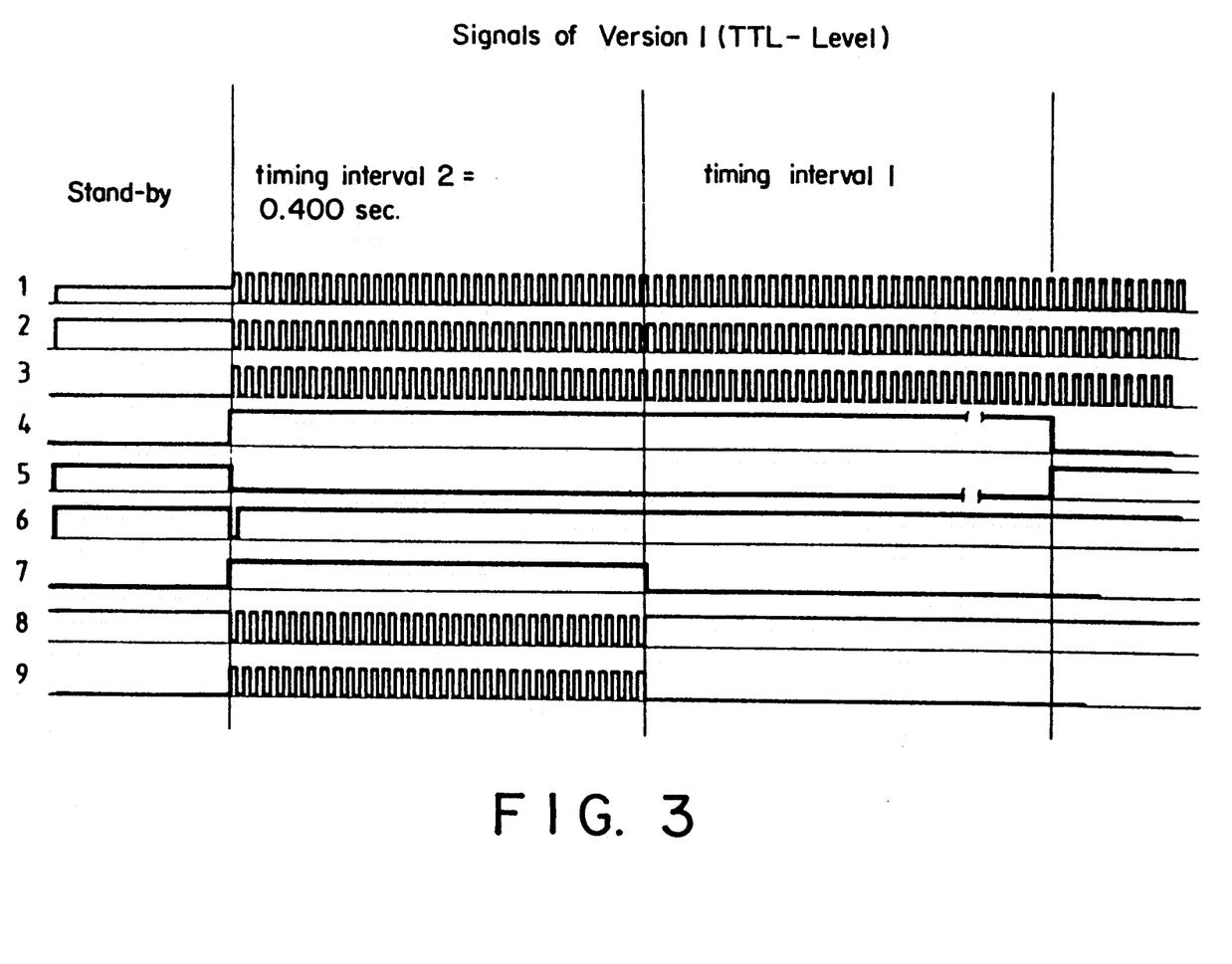
FIG. 3 is a time chart showing the shape and relative sequence of the various signals produced when operating the device of FIG. 1.

The device of this embodiment includes a circuit employing basically the same elements wherein the signals 1 to 7 compare to the signals 1 to 7 in FIGS. 2 and 3 and wherein the signals 9 and 10 compare to the signals 8 and 9 also in FIGS. 2 and 3.

According to the device of FIG. 4, the signal 7 of the timer 32 triggers an oscillator 44 and produces an output signal 8 which is fed to the NAND gate 40. The timing interval of the timer 32 is adjusted to a length (in the frequency range of 90 to 160 Hz) which is within the range between the time of a half and a full oscillation of signal 1. The counter 36 therefore counts the signals of the oscillator 44 exactly during the time of one half-oscillation of the signal 1. Calibration is possible by setting the frequency of the oscillator 44 according to the above example.

Figure 6:
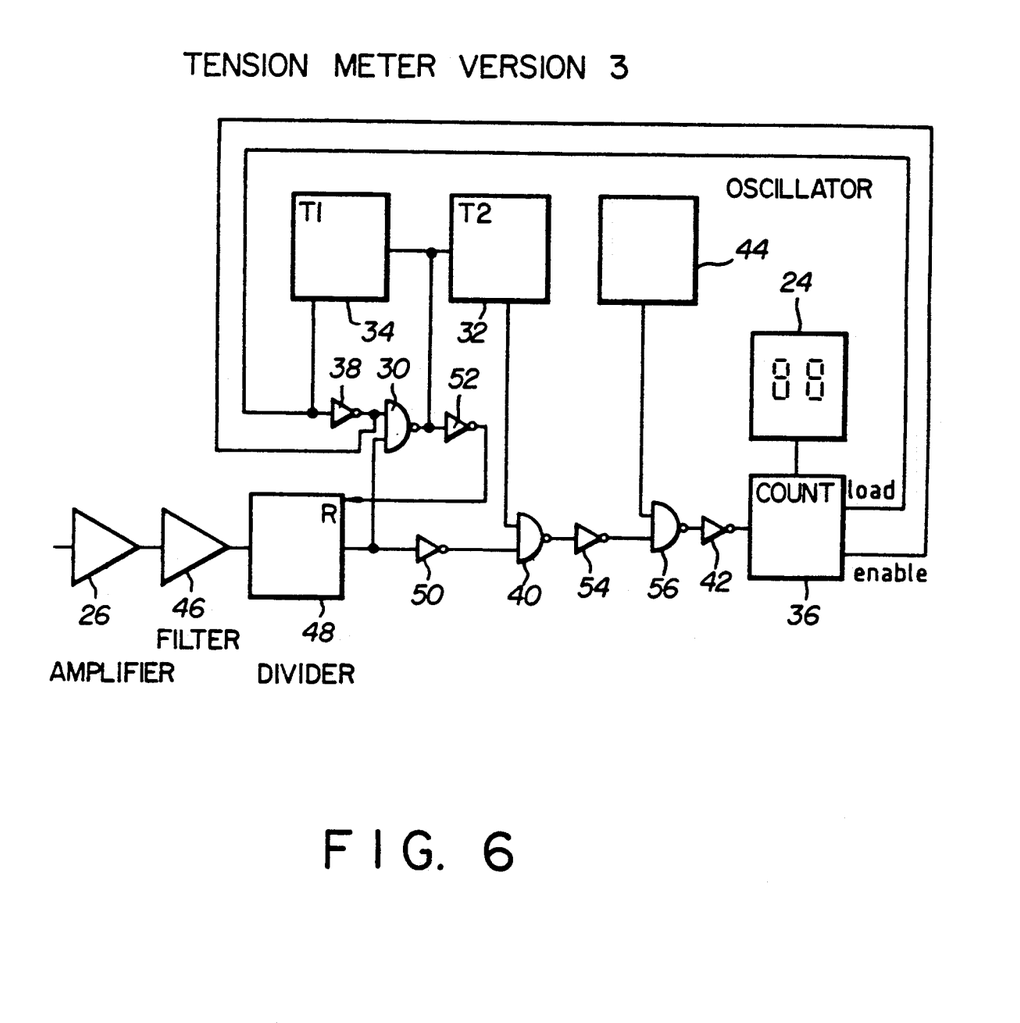
FIG. 6 is similar to FIG. 2 showing a further embodiment of a tension measurement device according to the invention.

Another embodiment of the invention which makes it possible to measure the string tension during the time of more than one full-wave of the oscillation of the membrane is shown in FIG. 6. Here, the output signal of the amplifier 26 is applied to the input of a frequency filter 46 which eliminates noise and other frequencies. The output of the filter is then applied to a frequency divider 48 which, for example, divides in the ratio of 1:10.

The output of the frequency divider 48 is applied to the NAND gate 30 and also in parallel to an inverter 50 and the NAND gate 40 and will change only after ten (10) full oscillations on the input side are completed. Together with the timers 32 and 34, the frequency divider 48 is reset by the inverter 52 connected between the output of the NAND gate 30 and the divider. During the following ten (10) full oscillations of the input signal, the NAND gate 40 and an inverter 54, a NAND gate 56 is controlled that the continuous clock signal of the oscillator 44 is connected to the counter 36. Before the frequency divider 48 delivers another clocking impulse, the timer 32 disables the counter 36 and inhibits further counting.

The presetting of the counter to the starting value is received in this design by the output signal of the timer 34 and by the output signal of the inverter 38 the counter is set to the enabled condition again.

The embodiment according to FIG. 6 is preferable for a safe operating condition due to the filter and the enlarged measurement time interval. Another benefit is that the first oscillations of the membrane (in this example 10) can be ignored by the circuit so that improper oscillations due to the induction of the oscillation are neglected. Thus also extremely hard hits to the frame or strings in order to induce an oscillation will not have any effect to the correct result of a measurement.

Figure 7:
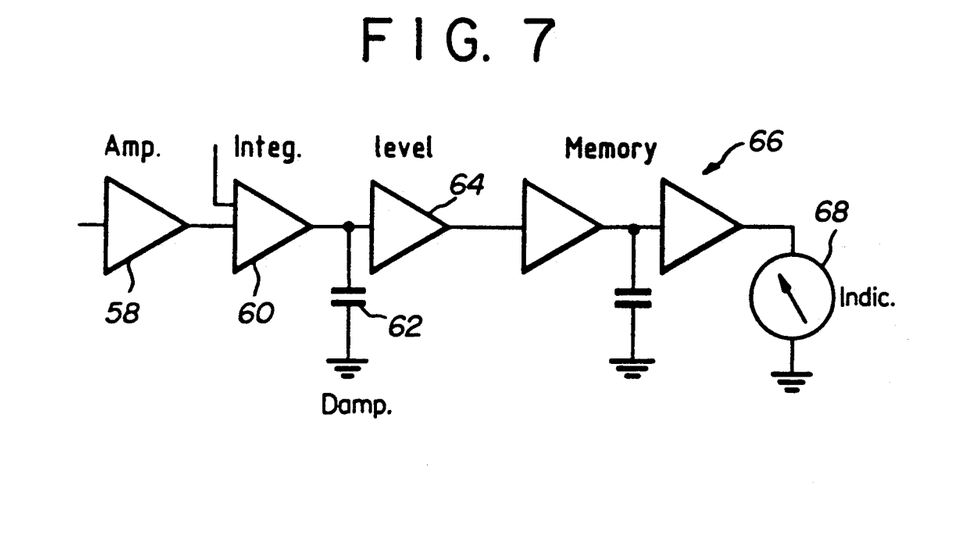
FIG. 7 is similar to FIG. 2 showing still another embodiment of a tension measurement device.

While the above described devices are based on digital circuitry, an analog circuit can be used in the tension measurement device as shown in FIG. 7.

Figure 8A:
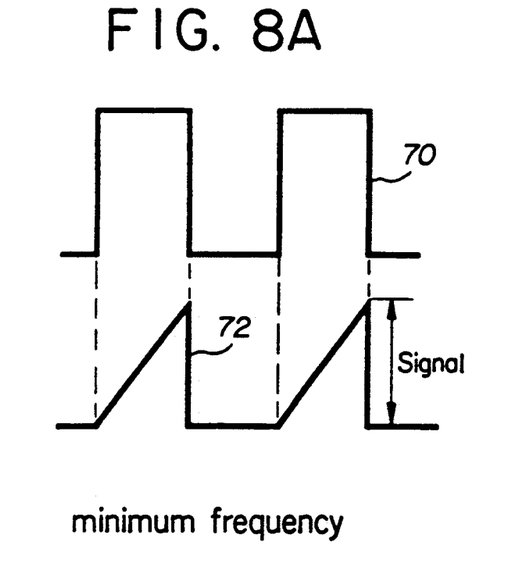
FIG. 8A and 8B are time charts showing the signals produced by the device of FIG. 7.
Figure 8B:
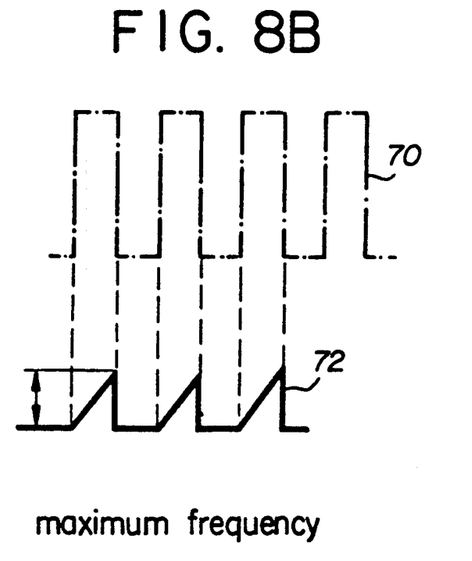

The signal supplied by the transmitter is fed to the amplifier 58 which amplifies with the highest possible ratio in order to shape the sine-shaped oscillation of the input to a rectangular signal. A ramp integrator 60 transforms this rectangular signal into a triangular shaped signal which amplitude is a function of the rectangular signal's period as shown in FIG. 8A and 8B. The triangular signal can be dampened by a capacitor 62 in order to reduce noise and improper signals in the beginning of each measurement. Due to the high amplification ratio, it is possible to receive a sufficient number of oscillations and the integrated signal can be dampened. The triangular signal is applied to an operational amplifier 64 which adjusts the impedance to the following sample and hold circuit 66 that serves as a memory to keep the measured signal. To show the results of the measurement, a conventional analog display 68 can be used but also a A/D converter for digital display or a line of LED's can be used as a display. The sample and hold circuit is switched back to neutral by means of a switch or by a timing element.

What is claimed is:

1. A method of measuring the tension of racket strings wherein the strings form a membrane mounted on the racket, which comprises:
   providing a device including means for measuring the frequency at which said device oscillates and for producing a signal corresponding thereto;
   affixing said device to said membrane;
   aperiodically inducing said membrane to oscillate freely at the natural frequency of said membrane and said device; and
   converting the signal produced by said measuring means to a value representing the tension of said strings.

2. A method according to claim 1, wherein said signal is produced by counting the number of half or full waves of oscillation of said device during a prefixed time interval.

3. A method according to claim 2, wherein the counting of said half or full waves begins only after completion of a predetermined number of oscillations.

4. A method according to claim 1, wherein said signal is produced by determining the time interval to complete a predetermined number of half or full waves of said signal.

5. A method according to claim 4, wherein the determination of said time interval begins only after completion of a predetermined number of oscillations.

6. A method according to claim 4, wherein said signal triggers a timing device which activates an electrical timer prefixed to a predetermined timing interval, said timing interval being longer than a half period and shorter than a complete period of the oscillation of said membrane.

7. A method according to claim 6, wherein the determination of said time interval begins only after completion of a predetermined number of oscillations.

8. A method according to claim 1, wherein said value is indicated in an analog or digital reading.

9. A method according to claim 1, wherein said electrical signal has a sine shaped electrical oscillation which is proportional to the induced oscillation of said membrane and wherein said signal is converted into a rectangular shaped signal the width of which is used as a time base to trigger a ramp integrator having an analog output signal the level of which is reciprocally proportional to the width of said rectangular signal and to the oscillation of said membrane.

10. A method according to claim 9, wherein said analog signal is transmitted to a sampling circuit which holds said signal after said oscillation is finished.

11. A method according to claim 1 wherein said membrane is induced to oscillate by mechanically impacting said racket or said strings.

12. A method according to claim 1, wherein said racket is used to strike a ball and wherein said device has a prefixed weight which is comparable to the weight of said ball.

13. A device for measuring the tension of racket strings wherein the strings form a membrane mounted on said racket comprising, in combination:
   a transmitter capable of producing an electrical signal corresponding to a mechanical oscillation applied to said transmitter, said transmitter being mechanically affixed to said membrane;
   an electrical circuit for calculating the frequency of oscillation of said signal, said circuit including an amplifier for amplifying said signal and a first and a second timer which are triggered by the output of said amplifier, said first timer disabling said amplifier output during the timing period of said second timer; and
   means for displaying the calculated frequency;
   said transmitter, electrical circuit and display means being incorporated into a single unit.

14. A device according to claim 13, wherein said circuit further includes a gate which receives the output of said amplifier and the output of said second timer and a counter which receives the output of said gate.

15. A device according to claim 14, wherein said circuit further includes an oscillator and a second gate which receives the output of said oscillator and said amplifier and wherein said first timer enables the counting of said counter only during a prefixed period.

16. A device according to claim 15, wherein said circuit further includes a frequency filter connected to the output of said amplifier.

17. A device according to claim 16, wherein said circuit further includes a frequency divider connected between said amplifier and said counter.

18. A device according to claim 15, wherein said first timer, oscillator and counter are adjusted in such manner that the indicated number exhibited by said display means at the end of each measurement is a liner approximated correlation between the string tension and the frequency of the membrane oscillation.

19. A device according to claim 13, wherein said circuit further includes a frequency filter connected to the output of said amplifier.

20. A device for measuring the tension of racket strings wherein the strings form a membrane mounted on said racket for striking a ball comprising, in combination:
   a transmitter capable of producing an electrical signal corresponding to a mechanical oscillation applied to said transmitter, said transmitter being mechanically affixed to said membrane;
   an electrical circuit for calculating the frequency of oscillation of said signal; and
   means for displaying the calculated frequency;
   said transmitter, electrical circuit and display means being incorporated into a single unit whose weight is comparable to that of said ball.

* * * * *